(12) United States Patent
Sturm, Jr. et al.

(10) Patent No.: US 7,444,742 B2
(45) Date of Patent: Nov. 4, 2008

(54) FLEXIBLE FIXTURE

(75) Inventors: Albert J. Sturm, Jr., Stillwater, MN (US); Wesley J. Rieckenberg, Forest Lake, MN (US); Richard J. Weniger, Blaine, MN (US)

(73) Assignee: Par Systems, Inc., Shoreview, MN (US)

( * ) Notice: Subject to any disclaimer, the term of this patent is extended or adjusted under 35 U.S.C. 154(b) by 161 days.

(21) Appl. No.: 10/870,333

(22) Filed: Jun. 17, 2004

(65) Prior Publication Data

US 2005/0015962 A1 Jan. 27, 2005

Related U.S. Application Data

(60) Provisional application No. 60/480,213, filed on Jun. 20, 2003.

(51) Int. Cl.
*B23P 21/00* (2006.01)
*B23Q 3/00* (2006.01)

(52) U.S. Cl. ............................ 29/712; 269/289 R

(58) Field of Classification Search .............. 29/712, 29/709, 700; 269/289 R, 21, 266, 297, 296, 269/309, 75, 64.1
See application file for complete search history.

(56) References Cited

U.S. PATENT DOCUMENTS

| | | | |
|---|---|---|---|
| 2,471,921 A | 5/1949 | Ashdown | |
| 3,542,354 A | 11/1970 | Fitzpatrick | |
| 3,853,313 A | 12/1974 | Appenzeller et al. | |
| 3,926,447 A | 12/1975 | Cox, Jr. | |
| 4,080,716 A | 3/1978 | Vom Dorp | |
| 4,088,312 A | 5/1978 | Frosch et al. | |
| 4,317,577 A | 3/1982 | Cameron | |
| 4,432,559 A | 2/1984 | Rasmussen | |
| 4,527,783 A * | 7/1985 | Collora et al. | 269/21 |
| 4,638,984 A | 1/1987 | Puisais et al. | |
| 4,684,113 A | 8/1987 | Douglas et al. | |
| 4,736,957 A | 4/1988 | Bischopink | |
| 5,163,793 A | 11/1992 | Martinez | |
| 5,230,594 A | 7/1993 | Pilkington | |
| 5,364,083 A | 11/1994 | Ross et al. | |
| 5,372,357 A | 12/1994 | Blaimschein | |
| 5,395,098 A | 3/1995 | Eickhorst et al. | 269/21 |
| 5,427,363 A | 6/1995 | Rink et al. | |
| 5,457,868 A | 10/1995 | Blaimschein | |
| 5,546,784 A | 8/1996 | Haas et al. | |
| 5,551,677 A | 9/1996 | Puettmer et al. | |
| 5,562,276 A | 10/1996 | Blick | |
| 5,590,870 A * | 1/1997 | Goellner | 269/21 |

(Continued)

OTHER PUBLICATIONS

Modig UHF Skin brochure, 3 pages, date unknown.

(Continued)

*Primary Examiner*—John C Hong
(74) *Attorney, Agent, or Firm*—Steven M. Koehler; Westman, Champlin & Kelly P.A.

(57) ABSTRACT

The present invention relates to an aligning fixture having a support with a reference surface, an aligning member and an actuator. The actuator is mounted to the support and operably coupled to the aligning member. The actuator moves the aligning member selectively to a first position wherein the element to be aligned is spaced apart from the reference surface and to a second position where the element can engage the reference surface.

21 Claims, 18 Drawing Sheets

U.S. PATENT DOCUMENTS

| | | |
|---|---|---|
| 5,722,646 A | 3/1998 | Soderberg et al. |
| 6,012,711 A | 1/2000 | Cipolla ......................... 269/21 |
| 6,209,188 B1 | 4/2001 | Soderberg et al. |
| 6,250,619 B1 | 6/2001 | Cook et al. |
| 6,454,333 B2 | 9/2002 | Portal ......................... 294/64.1 |
| 6,575,443 B2 | 6/2003 | Kick ............................. 269/75 |
| 6,578,399 B1 | 6/2003 | Haas et al. ..................... 72/57 |

OTHER PUBLICATIONS

Official Search Report of the European Patent Office in counterpart foreign application No. 04755376.3 filed Jun. 17, 2004.

* cited by examiner

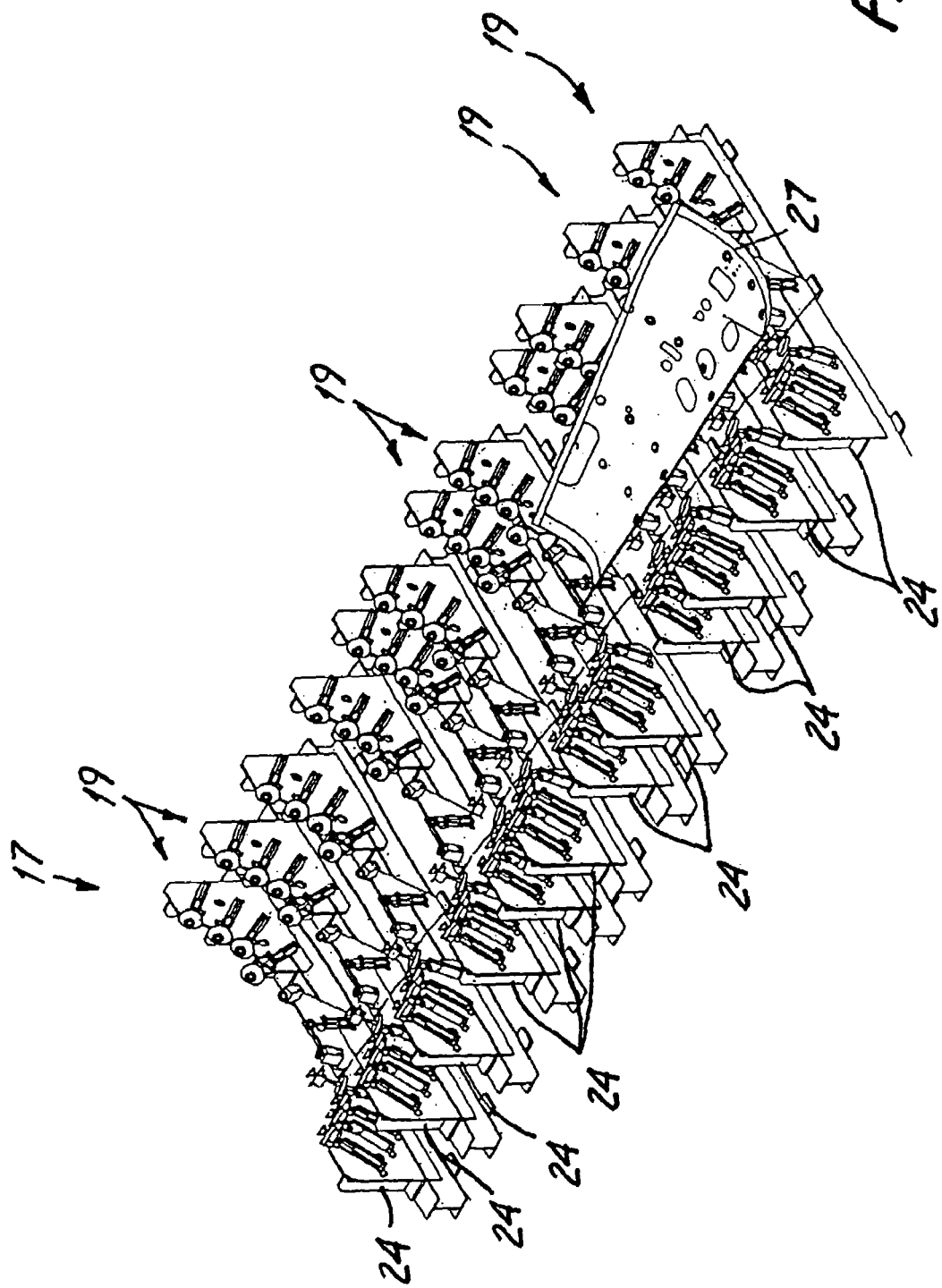

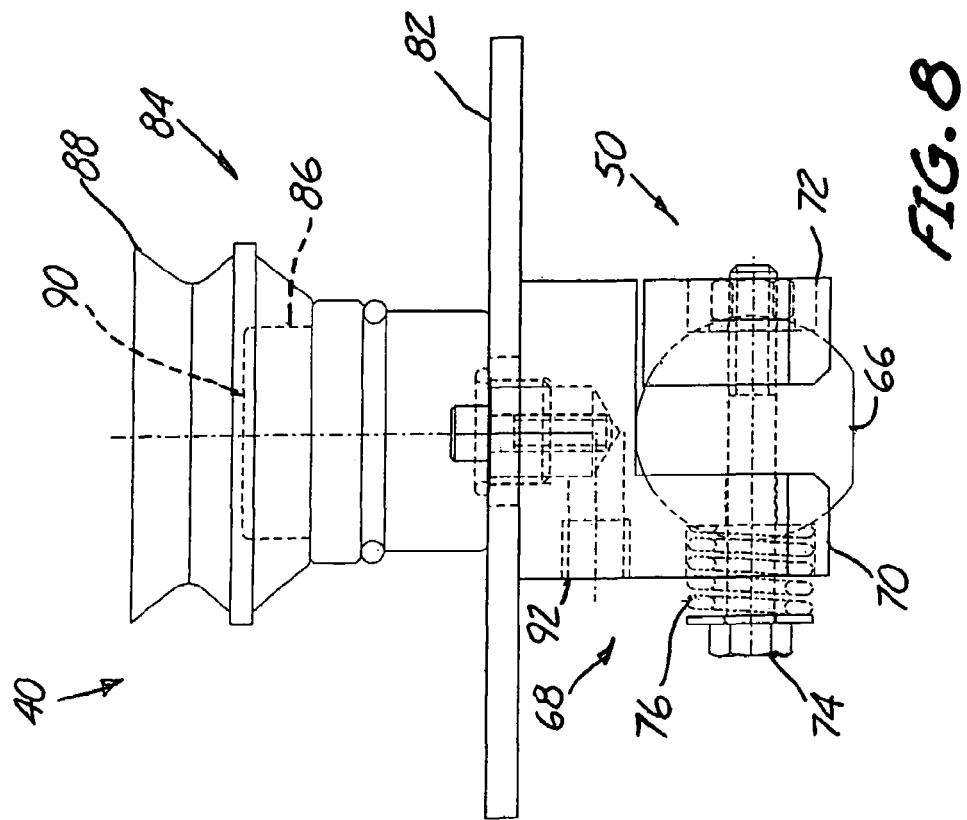
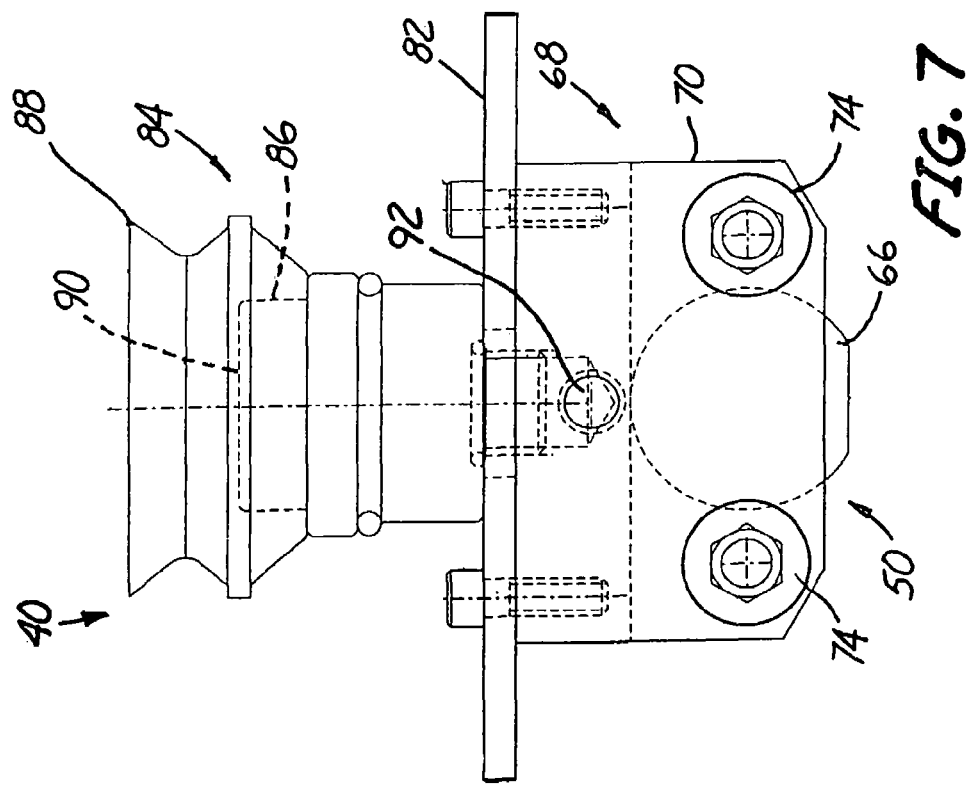

FLEXIBLE FIXTURE

CROSS REFERENCE TO RELATED APPLICATION

The present application is based on and claims the benefit of U.S. provisional patent application Ser. No. 60/480,213, filed Jun. 20, 2003, the content of which is hereby incorporated by reference in its entirety.

BACKGROUND OF THE INVENTION

The present invention relates to fixtures for holding workpieces during machining, inspection or other operations performed thereon. In particular, aspects of the present invention relate to a fixture for holding large workpieces having surfaces of high curvature or other complex shapes.

Holding fixtures for three dimensional workpieces are available from Modig Machine AB of Virserum, Sweden and CNA Manufacturing Systems, Inc. of Woodinville, Wash. These fixtures hold workpieces in a fixed position through an array of posts. Each of the posts are equipped with a flexible vacuum cup that when seated upon a portion of the surface of the workpiece forms a vacuum. When a vacuum is pulled in each of the posts, the workpiece is held securely. The posts are arranged in a grid pattern, oriented vertically, such that when the vacuum cups are in a home or resting position each of the vacuum cups lay in a common plane. In order to hold a three dimensional part, each of the posts are adjusted vertically so as to conform the posts taken as a whole to the outer surface of the workpiece to be held. In the Modig System, a large setting machine is provided to adjust the posts. In particular, a gantry setting machine includes two guide rails positioned along opposite sides of the grid of posts and a bridge spanning between the guide rails carries a plurality of setting fixtures used to set the vertical height of each of the posts. As indicated above, the posts are arranged in a grid pattern of equally spaced rows and columns. The setting device, disposed on the bridge, conforms to the row spacing of the posts in the grid. As the bridge moves along the guide rails, the height of each of the setting devices on the bridge is adjusted such that when the corresponding post, located below each setting device, is actuated the post extends upwardly until the desired height of the vacuum cup is obtained. The bridge is moved along the grid on a column-by-column basis setting each column of posts of the grid in this manner. The grid pattern of the posts and the setting bridge may limit the extent of curvature that the workpieces can have.

The vacuum cup of each post is coupled to an actuator rod of the post with a flexible coupling. The vacuum cup is designed to be as flexible as possible to clamp workpieces under vacuum with a steep contact angle to the reference ball of the coupling or the axis of the actuator. The design requires a very flexible or loose coupling between the vacuum cup and the actuator rod such that when a vacuum is drawn, the vacuum cup can orient itself and properly seat upon the workpiece. However, for workpieces having high curvature, this may cause the loose coupling to drop under gravity, rendering it difficult to orient the vacuum cup normal to the surface of the workpiece in order to be properly seated.

It is the object of the present invention to provide an improved holding fixture or assembly that can hold workpieces having surfaces of high curvature or complex shapes. Aspects of the present invention individually address the foregoing problems.

SUMMARY OF THE INVENTION

One aspect of the present invention relates to an aligning fixture having a support with a reference surface. The fixture also includes an aligning member and an actuator mounted to the support and operably coupled to the aligning member to move the aligning member selectively to a first position. An element to be aligned is spaced apart from the reference surface in the first position and the actuator moves the aligning member to a second position where the element can engage the reference surface. Additionally, the aligning fixture can be implemented in a positioning system wherein a positioning device with an end effector detachably couplable to a mount on the aligning fixture and a tool is used to perform inspection or work on a workpiece.

Another aspect of the present invention is a holding assembly having a plurality of support assemblies. Each support assembly includes a linear actuator mounted to a support such that at least some of the axes of the linear actuators are non-parallel.

Furthermore, a method for aligning a remote end of a support assembly used to support a workpiece is provided. The method includes positioning an aligning member at a first position with respect to a reference surface to engage the remote end and orient the remote end. The aligning member is further moved to a second position that allows the remote end to engage the reference surface.

BRIEF DESCRIPTION OF THE DRAWINGS

FIG. 3 is a perspective view of a holding assembly.
FIG. 7 is a side view of a vacuum cup assembly.
FIG. 8 is another side view of the vacuum cup assembly.

DETAILED DESCRIPTION OF THE PREFERRED EMBODIMENTS

Figure 1:
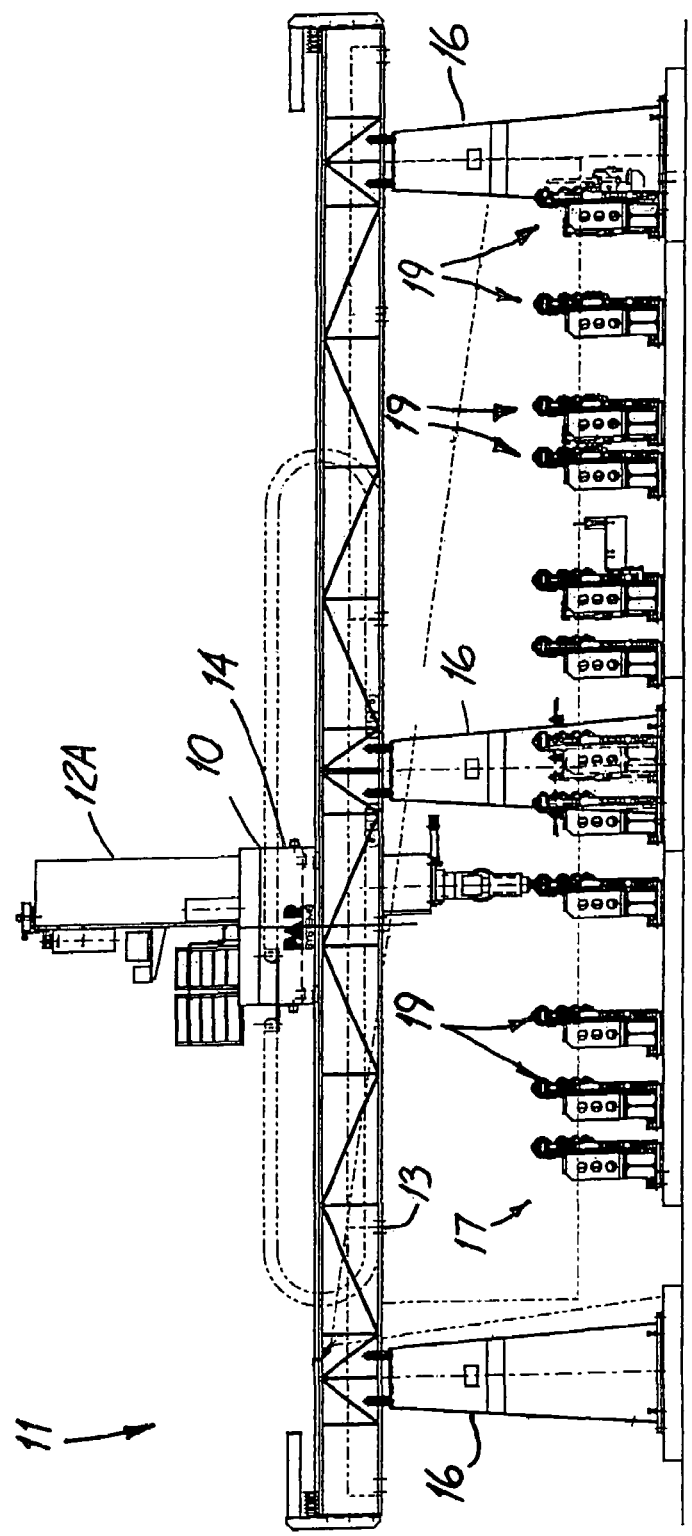
FIG. 1 is a side view of a gantry system.
Figure 2:
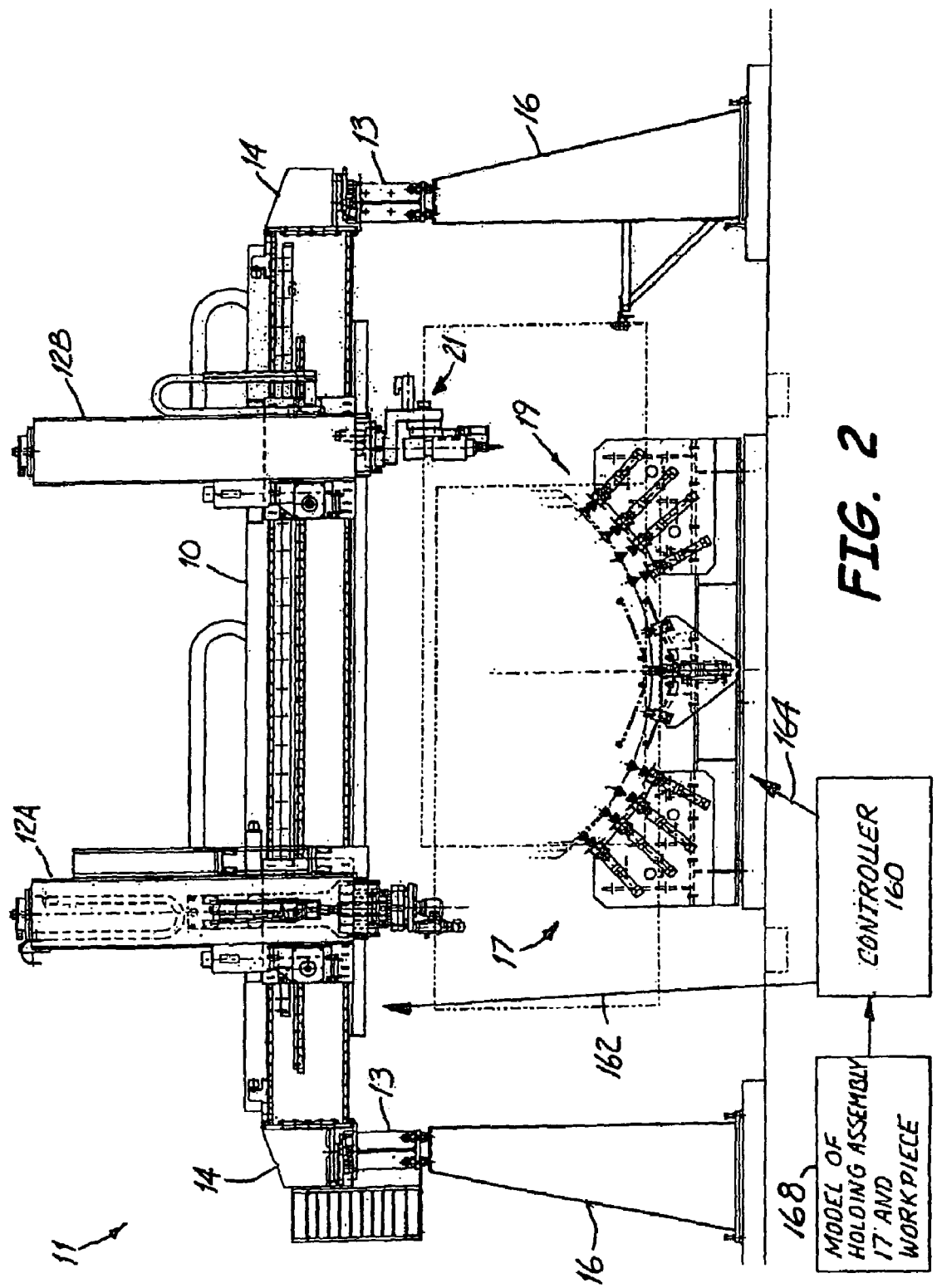
FIG. 2 is an end view of the gantry system illustrated in FIG. 1.

Referring to FIGS. 1-2, a gantry or positioning system is illustrated at 11. The gantry system 11 includes a pair of space-apart rails 13. In the exemplary embodiment, rails 13 are elevated, being supported by supports 16. A bridge 10 spans between rails 13. Two trucks 14 are coupled to bridge 10 and further coupled to rails 13 in order to provide horizontal movement of bridge 10 in a direction parallel to the guide rails 13. Bridge 10 supports at least one mast 12A and 12B. In the embodiment illustrated, mast 12A is adapted to hold an end effector such as a laser cutting device for performing work on a workpiece supported by a holding assembly 17. Mast 12B is also adapted to hold an end effector, which can include for example, a drill for performing work on the workpiece, but as further explained below, can also hold an aligning fixture used to position and/or orient each of a plurality of support assemblies 19 comprising the holding assembly 17.

In the embodiment illustrated, mast 12B comprises a telescoping assembly in order to allow an end effector 21 attached to an end thereof to move in a vertical direction wherein movement of the mast 12B along the bridge 10 and movement of the bridge 10 along the guide rails 13 are orthogonal to the vertical direction of the mast 12B, thereby providing three-dimensional movement of the end effector 21. Rotational movements of the end effector 21 can provide at least two additional degrees of freedom. In this embodiment, the guide rails 13, trucks 14, mast 12B, bridge 10 and end effector 21 thereby provide five degrees of positioning movement. It should be understood that this is but one exemplary form of a positioning or robotic device to provide such movement wherein other robotic devices of different forms can be used to achieve desired positioning of an aligning fixture, described in detail further below, which herein can be selectively coupled to the end effector 21.

As illustrated in FIG. 3, the holding assembly 17 typically comprises a plurality of support assemblies 19, each of which is configured to engage a portion of a workpiece 27). In general, as an aspect of the invention, the holding assembly 17 includes a plurality of support assemblies 19 having actuators (herein embodied as linear actuators) mounted to a support such that at least some of the axes of the actuators are non-parallel. In a further embodiment, remote ends of the actuators can be selectively positioned to define points along a curve. In the embodiment illustrated, the holding assembly 17 includes a plurality of spaced-apart banks 24. Each bank 24 includes a plurality of support assemblies 19. In this embodiment, the holding assembly 17 is adapted to support workpieces with high curvature such as cylindrically shaped or conical shaped objects, such as portions of an aircraft fuselage.

Figure 4:
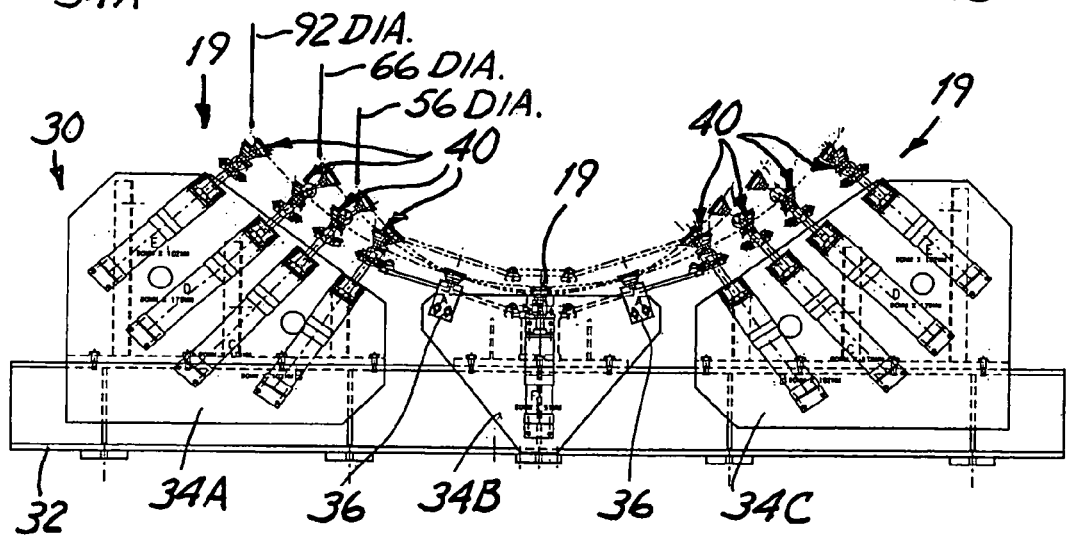
FIG. 4 is an end view of the holding assembly illustrated in FIG. 3 in a first configuration.

As is well known, the fuselage of an aircraft can vary significantly along its longitudinal length. The holding assembly 17 is particularly adapted to hold a wide variety of fuselage portions of varying diameter or radius as well as different chord lengths. With further reference to FIG. 4, the support assemblies 19 of each bank 24 are disposed on a support structure 30 of the bank 24 so that remote ends engaging the workpiece generally lay along a common perimeter line or curve of the workpiece. However, this orientation should not be considered required or limiting in that it may not be desired or necessary to support all workpieces in this fashion.

Referring to FIG. 4, the support structure 30 for a bank 24 is illustrated. In this embodiment, the support structure 30 includes a base 32 and upstanding support plates 34A, 34B and 34C. Support plate 34B can be disposed between support plate 34A and 34C in a fixed position to the base 32. The support plate 34B supports a moveable support assembly 19 and two fixed assemblies 36.

Each of the support plates 34A and 34C can support one or a plurality of movable support assemblies 19 in a manner so as to be spaced apart along the chord length of the workpiece to be supported. As will be discussed further below, each of the support assemblies 19 on support plates 34A and 34C include a remote end 40, herein a vacuum cup, that is mounted upon a friction settable coupling 50 (FIGS. 7 and 8) such as a ball swivel. The friction settable coupling 50 allows the remote end 40 to be adjusted in a manner so as to coincide with the workpiece to be supported and remain in said position until the workpiece is placed thereon.

Figure 5:
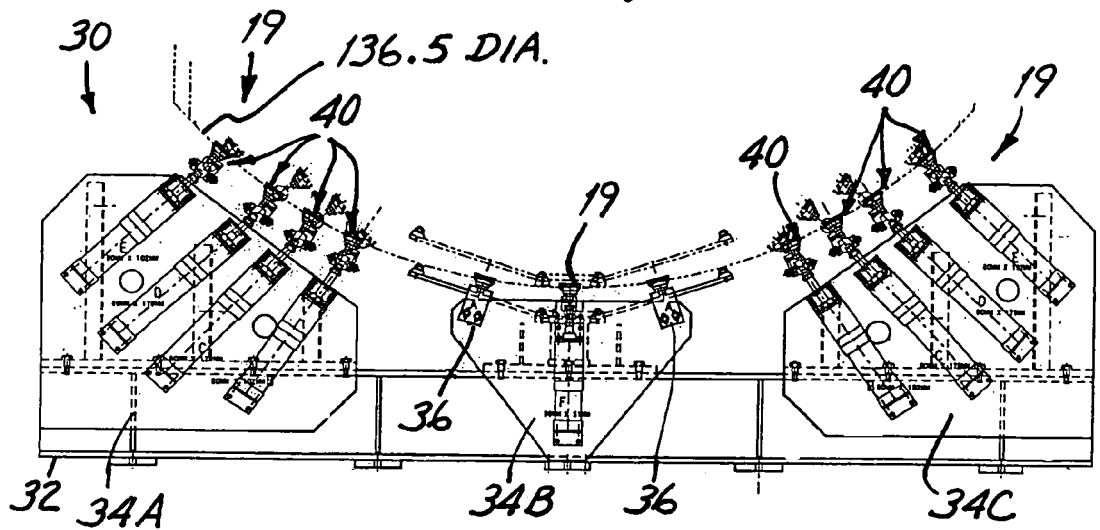
FIG. 5 is an end view of the holding assembly illustrated in FIG. 3 in a second configuration.

FIGS. 4 and 5 illustrate the flexibility that can be achieved using this construction. FIG. 4 illustrates orientation of the remote ends 40 of the support assemblies 19 for different diameters and different chord lengths of various workpieces. With comparison to FIG. 5, it can be seen that support plates 34A and 34C can be moved relative to each other and support plate 34B along the base 30 and secured thereto to provide support for workpieces of yet larger diameter and chord lengths. It should be noted that the support assemblies provided on support plate 34B have ends that engage the workpiece without a friction settable coupling 50 in that the curvature and chord length for the various workpieces does not vary substantially, thus a friction settable coupling is not needed. However, if desired, the center support plates 34B can include support assemblies 19 with friction settable couplings 50 as found on the support assemblies 19 of support plates 34A and 34C Referring to FIG. 6, each support assembly 19 comprises an actuator 60. In the exemplary embodiment, the actuator 60 is dual acting allowing for an extension and retraction. Herein, the actuator 60 is pneumatic; however, other suitable actuators can comprise hydraulic, electric (e.g. electric linear motor), mechanical (e.g. screws, levers, springs), or combinations thereof. In the embodiment illustrated, the support assembly 19 further includes a brake or lock assembly 62 to hold or fix the remote end 40 (not shown in FIG. 6) in a selected position. In this manner, pressure need not be maintained in the support assemblies 19 to hold the workpiece, but rather, when a desired position is obtained, the brake assembly 62 is operated to hold the end of the support assembly 19 in a fixed position. For an actuator 60 comprising a cylinder and a movable piston disposed therein, the brake assembly 62 can operate on the actuator rod connecting the piston to the remote end 40. The brake assembly 62 can be biased so that an actuating signal releases the brake assembly 62, while absence of the signal will cause the brake assembly 62 to hold the remote end 40 in a fixed position.

Figure 9:
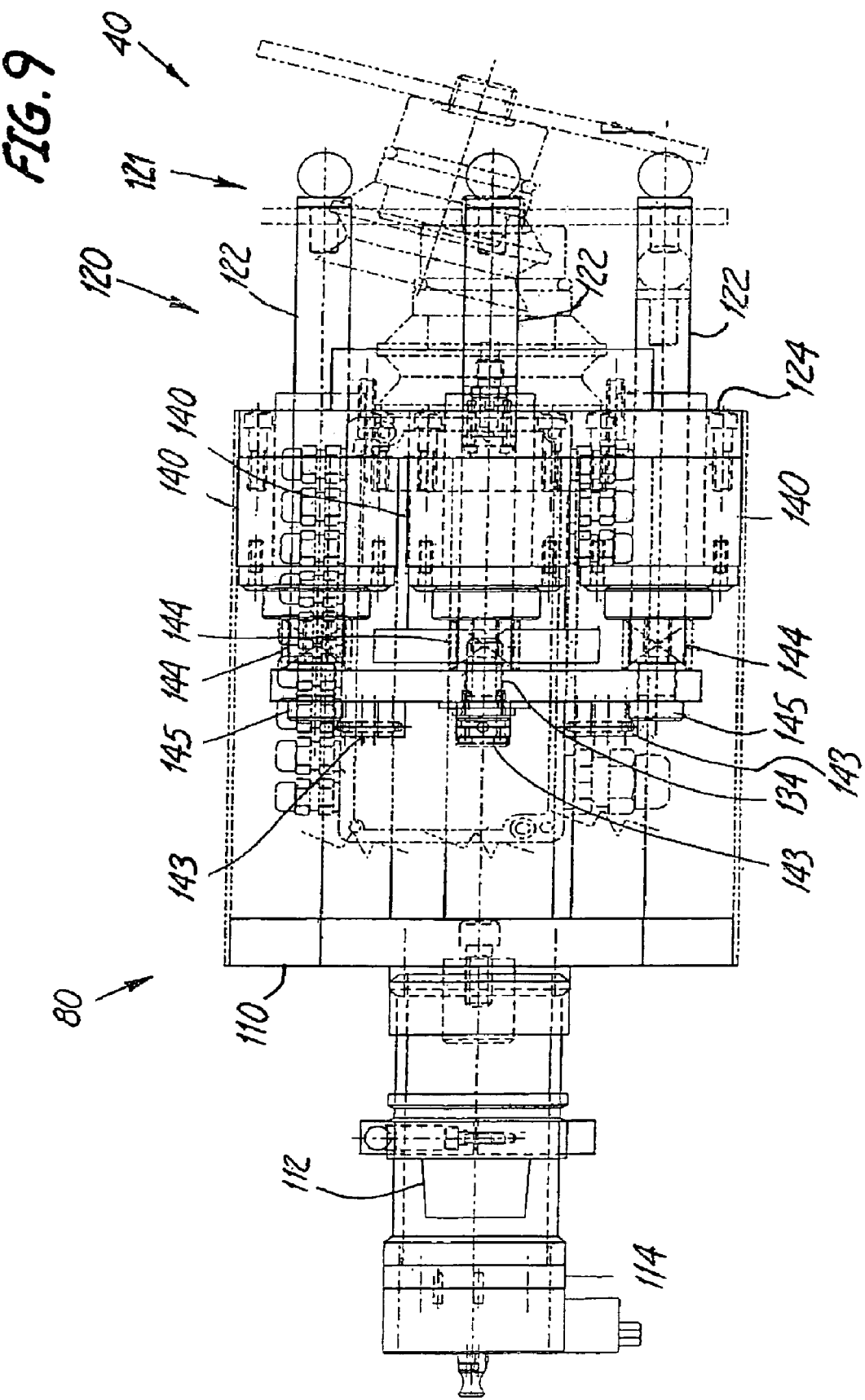
FIG. 9 is another side view of the aligning fixture.
Figure 10:
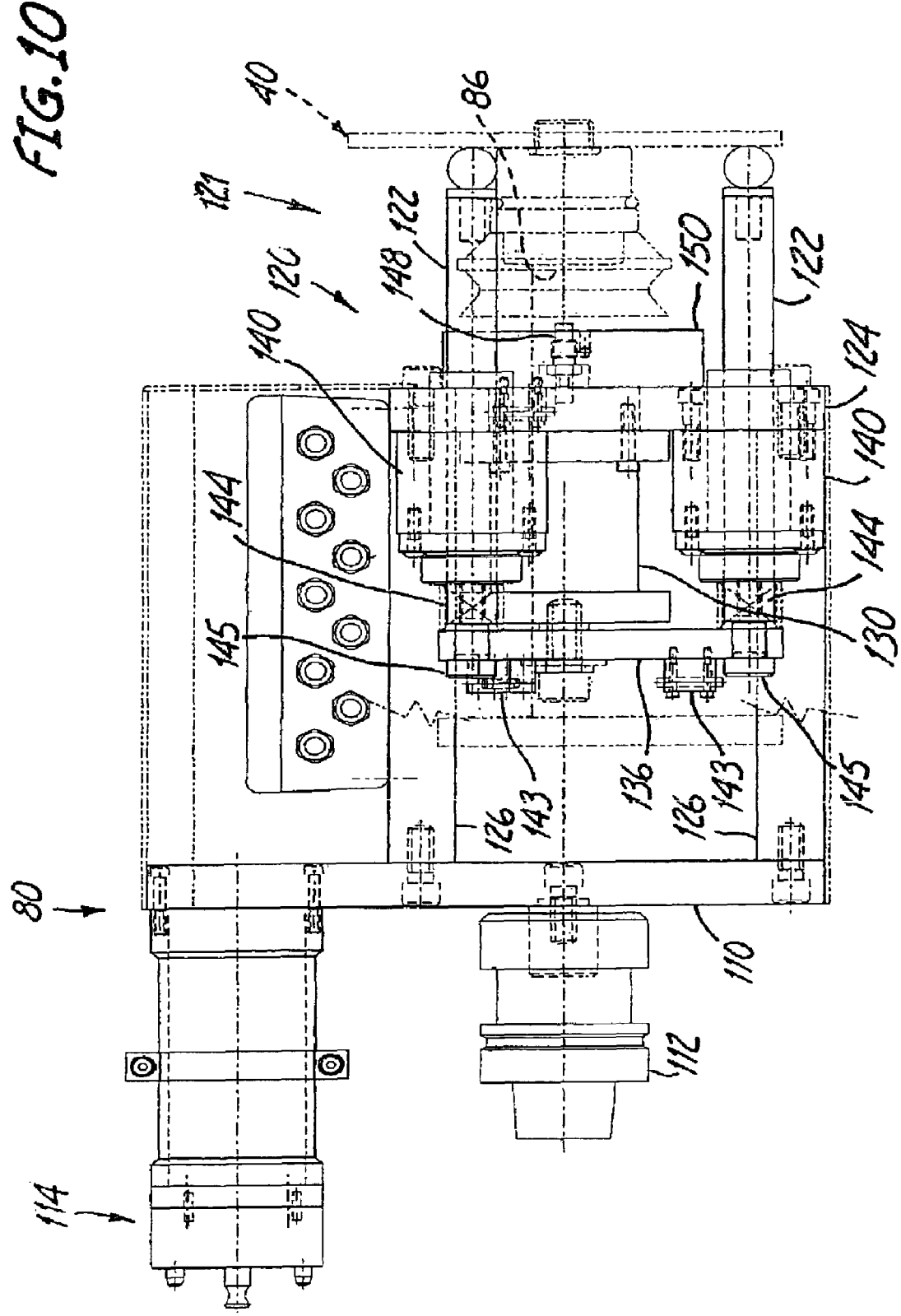
FIG. 10 is a side view of the aligning fixture.
Figure 11:
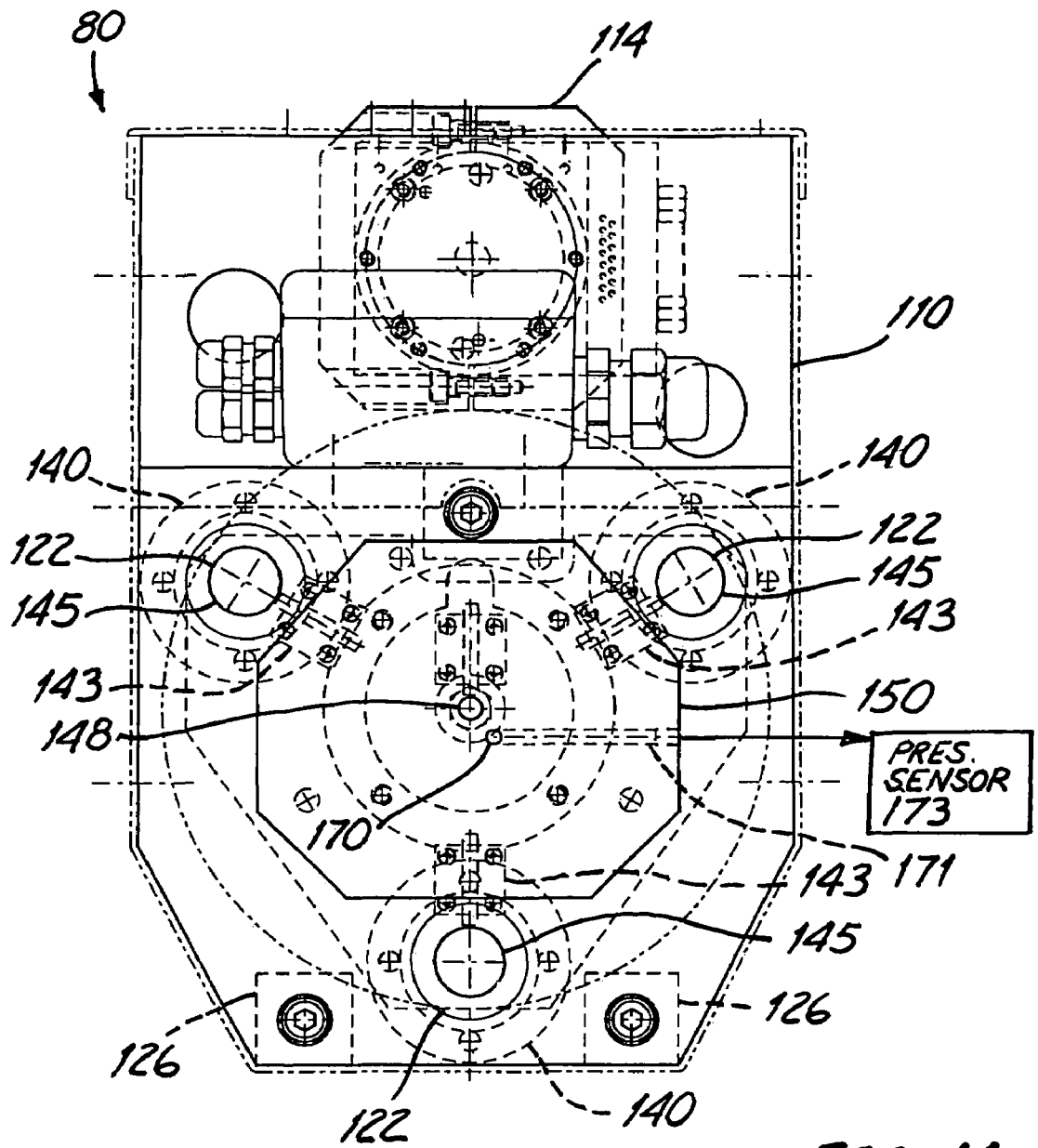
FIG. 11 is an end view of an aligning fixture.

FIGS. 7 and 8 illustrate a remote end 40 comprising a vacuum cup assembly. The remote end 40 is coupled to the actuator rod with a friction settable coupling 50, herein a ball swivel comprising a ball 66 and a corresponding socket assembly 68. The socket assembly 68 comprises a friction clamp for the ball 66 formed as a fixed socket portion 70 and a movable socket portion 72. The movable socket portion 72 is coupled to the fixed socket portion 70 with fasteners 74, herein nut and bolt assemblies and biasing springs 76. Each of the socket portions 70 and 72 include inner recesses conforming to the ball 66. When clamped upon the ball 66, the clamping force is adjusted so as to allow movement of the socket portions 70 and 72 over the ball surface when a substantial force is applied. The amount of force can be adjusted through the nut and bolt assembly 74 and biasing springs 76. As will be explained below, the remote end 40 is adjusted by use of an aligning fixture 80 (FIGS. 9, 10 and 11). The clamping force for the ball swivel is chosen to allow movement through use of the aligning fixture 80, but the remote end 40 will retain the aligned position once the aligning fixture 80 is removed and resist movement under gravity loading prior to loading of the workpiece as well as during loading of the workpiece.

The fixed socket portion 70 is coupled to an alignable member 82 herein a flange or a plate that extends around and about a vacuum cup assembly 84. The vacuum cup assembly 84 includes a mount 86 and a deformable cup 88. The mount 86 includes a support surface 90 positioned within the deformable cup 88 used to support a portion of the workpiece. A port 92 is provided in the fixed socket portion 70 for coupling to a suitable vacuum source. The port 92 is fluidly coupled to passageways in the fixed socket portion 70, alignable member 82 and mount 86 for pulling the vacuum within the deformable cup assembly 84 when desired.

Figure 6:
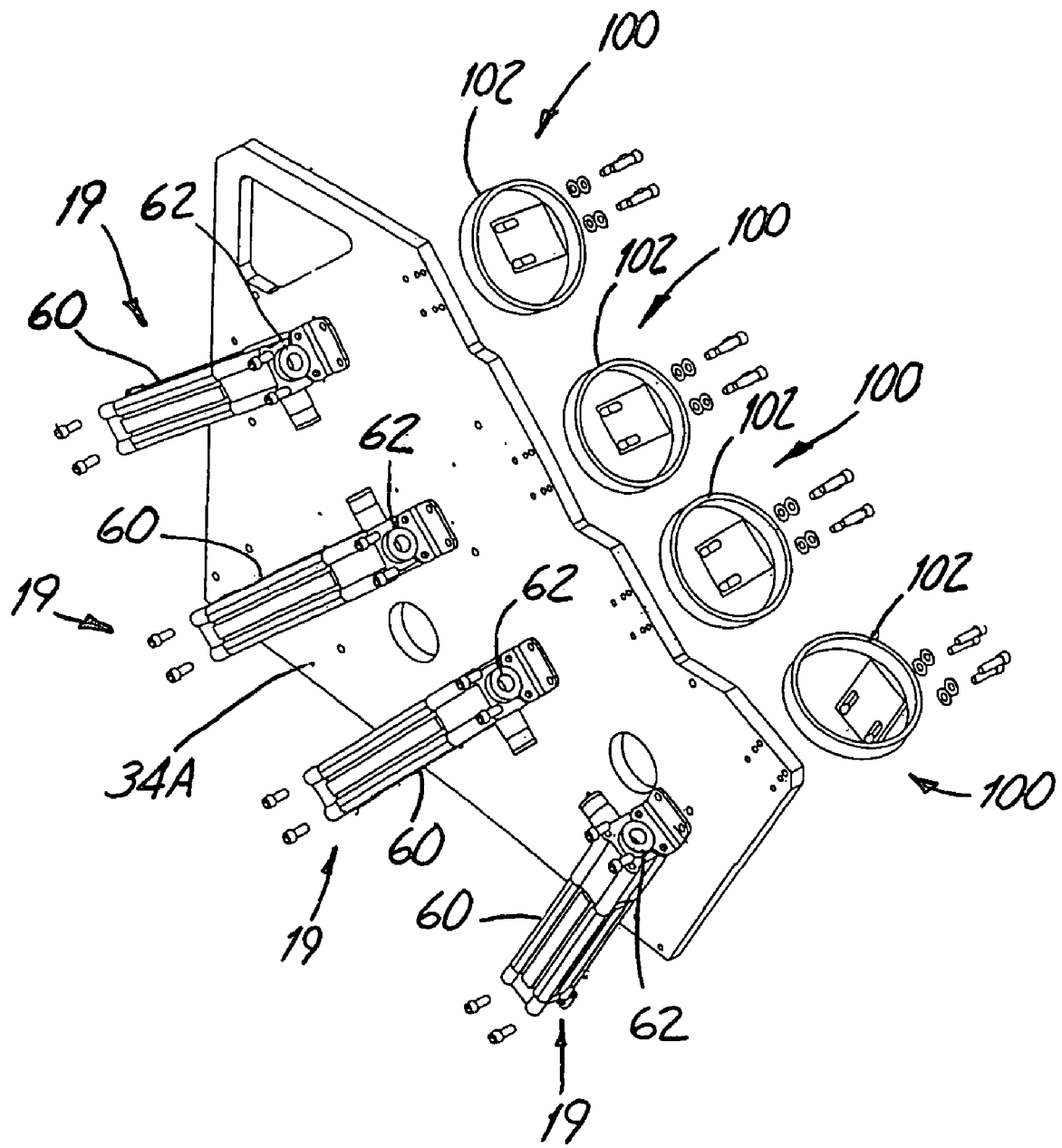
FIG. 6 is a perspective view of an alignment assembly.
Figure 12:
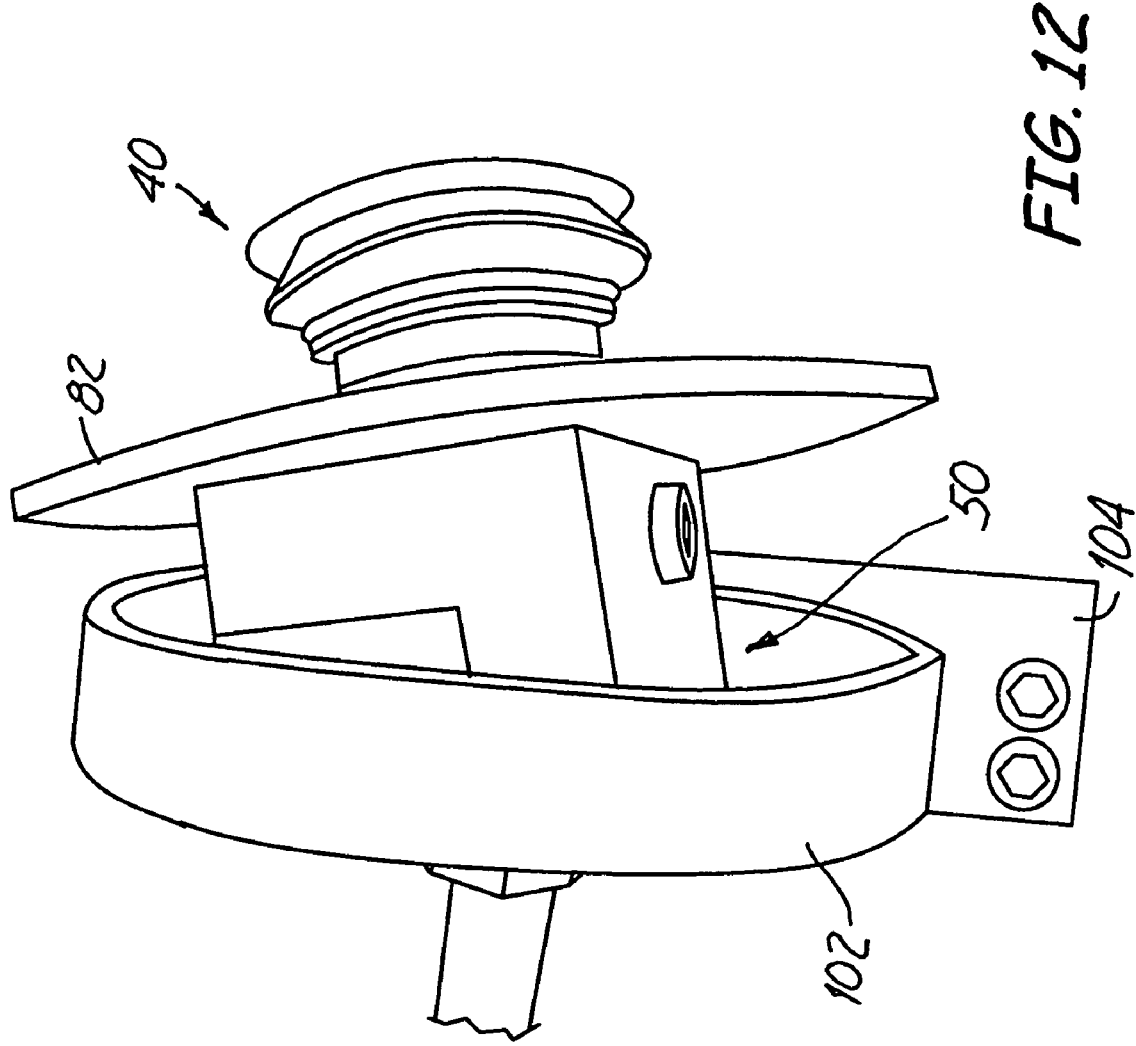
FIG. 12 is a perspective view of a remote end.
Figure 13:
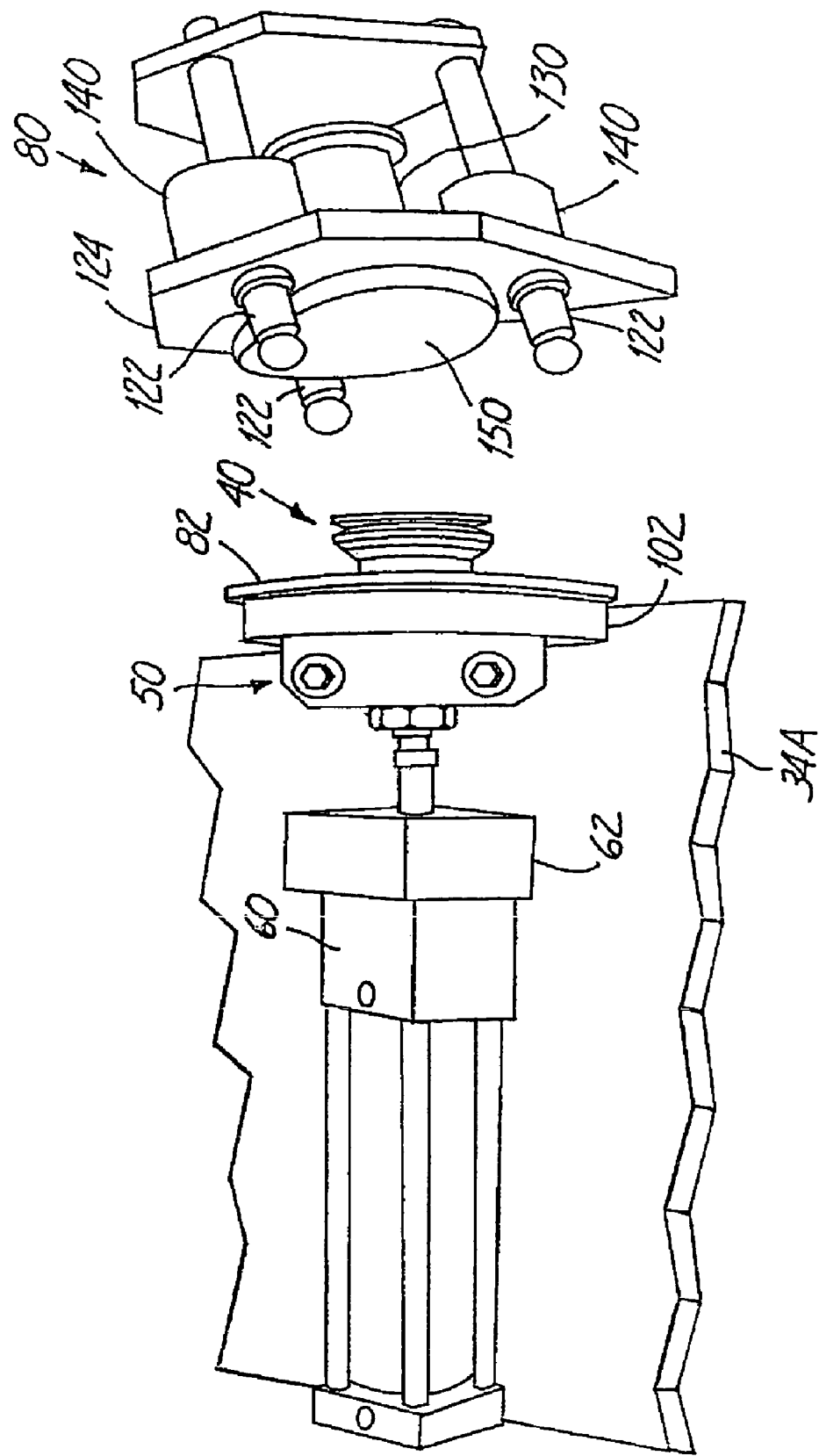
FIGS. 13-18 are schematic views of alignment between a remote end and an aligning fixture.

Referring to FIG. 6, an alignment assembly 100 is provided to locate each remote end 40 of each support assembly 19 in a home position. In the embodiment illustrated, the alignment assembly 100 includes a stop 102 that selectively engages the alignable member 82 of the remote end 40 upon actuation of the support assembly 19 to cause retraction of the remote end 40. In the embodiment illustrated, the stop 102 comprises a ring encircling the actuator rod and held in a fixed position by a flange 104 secured to the corresponding support plate 34A, 348 or 34C. As the remote end 40 is retracted as best illustrated in FIG. 12, portions of the alignable member 82 will come into contact with the stop 102 as it is retracted, thereby causing rotation of the alignable member 82 through the friction settable coupling 50, if necessary, until the alignable member 82 is oriented parallel to end surface of the ring 102 and fully in contact therewith (FIG. 13).

The aligning fixture 80 is illustrated in FIGS. 9-11. The aligning fixture 80 includes a base 110. A detachable mount 112 is secured to the base 110 and is adapted to be received or otherwise coupled to the end effector 21 when desired. Preferably, a detachable coupler 114 is provided for signal and/or supply lines. The detachable coupler 114 mates with a corresponding coupler provided on the end effector 21 in order to transmit sensor signals and supply power (e.g. pneumatic, hydraulic, electric) as necessary.

The aligning fixture 80 includes an aligning device 120, preferably to establish a remote, aligned position for the remote end 40 of each support assembly 19. The remote, aligned position is defined as an initial position that after establishment, the remote end 40 of each support assembly 19 can be easily displaced to obtain a final aligned position. Herein, the remote, aligned position is different only in a simple translational movement with respect to the final aligned position although other movements such as rotation alone or in combination with translation can be used. In this embodiment, the translational movement is provided by further extension of the remote end 40 along the axis of the rod of the actuator 60. As will be explained below, the aligning fixture 80 causes movement of the remote end 40 about the friction settable coupling 50 to achieve proper orientation of the remote end 40 to achieve the remote, aligned position.

The aligning fixture 80 includes movable aligning members 121 that can be used to align the remote end 40, and then moved out of the way to allow the remote end 40 to be moved from the remote, aligned position to the final aligned position. In the embodiment illustrated, the aligning members 121 include movable supports comprising retractable, elongated rods 122. A plate 124 is coupled to the base 110 by supports 126. An actuator 130 extends and retracts the rods 122. Herein, a single actuator 130 is provided to extend and retract the rods simultaneously. In the embodiment illustrated, the actuator 130 is secured to the plate 124. An actuator l30 rod is joined to a connector plate 136, that in turn is coupled to each of the elongated rods 122. The elongated rods 122 extend through guide assemblies 140 and apertures in the plate 124. In the embodiment illustrated, the actuator 130 comprises an pneumatic actuator; however, any form of actuator such as a hydraulic actuator, an electric actuator (e.g. electric linear motor) or mechanical actuator (screw, lever, spring, etc.) can be used.

Sensors are provided to detect positioning of the remote end 40 of each support assembly 19 in the remote, aligned position and at the final aligned position. These sensors can comprise proximity or limit switches or take other forms as appreciated by those skilled in the art. In the embodiment illustrated, each elongated rod 122 is operably coupled to a limit switch 143 such that upon a small deflection or movement thereof (herein as measured by ends 145 of rods 122 moving relative to connector 136) indicating contact of the rod 122 with the alignable member 82 of the remote end 40, a signal is provided. In the illustrated embodiment, springs 144 bias the rods 122 against connection 136 awaiting contact with alignable member 82.

A limit switch 148 is also provided on the plate 124, in particular, a standoff forming a registration surface 150 (or, alternatively a reference surface) secured thereto, which corresponds to the final aligned position when the support surface 90 of the mount 86 of each remote end 40 of the support assembly 19 makes contact therewith.

The aligning fixture 80 is mounted to the end effector 21 and is used to align each remote end 40 of each support assembly 19 for the workpiece to be supported by the holding assembly 17. Generally, the desired position for each remote end 40 of each corresponding support assembly is provided to a controller 160 in FIG. 2. The controller 160 provides suitable control signals (represented by arrow 162) to operate motors controlling the placement of the bridge 10 on the guide rails 13, the mast 12B on the bridge 10, the extension of the mast 12B and the orientation of the end effector 21 in order to obtain desired positions of the aligning fixture 80. The controller 160 also operates each of the support assemblies 19 herein represented by arrow 164.

In one embodiment, the positions of each remote end 40 can be ascertained manually by placing the workpiece on the holding assembly 17 and individually adjusting each of the support assemblies 19 until the proper position of each remote end 40 has been obtained at which point measurements can be obtained and stored for future use. In another embodiment, a representation of the holding assembly 17 is stored in memory of a computer represented by block 168 thereby comprising an analytical model. A model of the workpiece is combined with the model of the holding assembly 17 so as to calculate the orientation and/or position of each remote end 40 of each support assembly 19 that will be used to support the workpiece. The positional information of each remote end calculated from the model 168 is then used by the controller 160.

Figure 14:
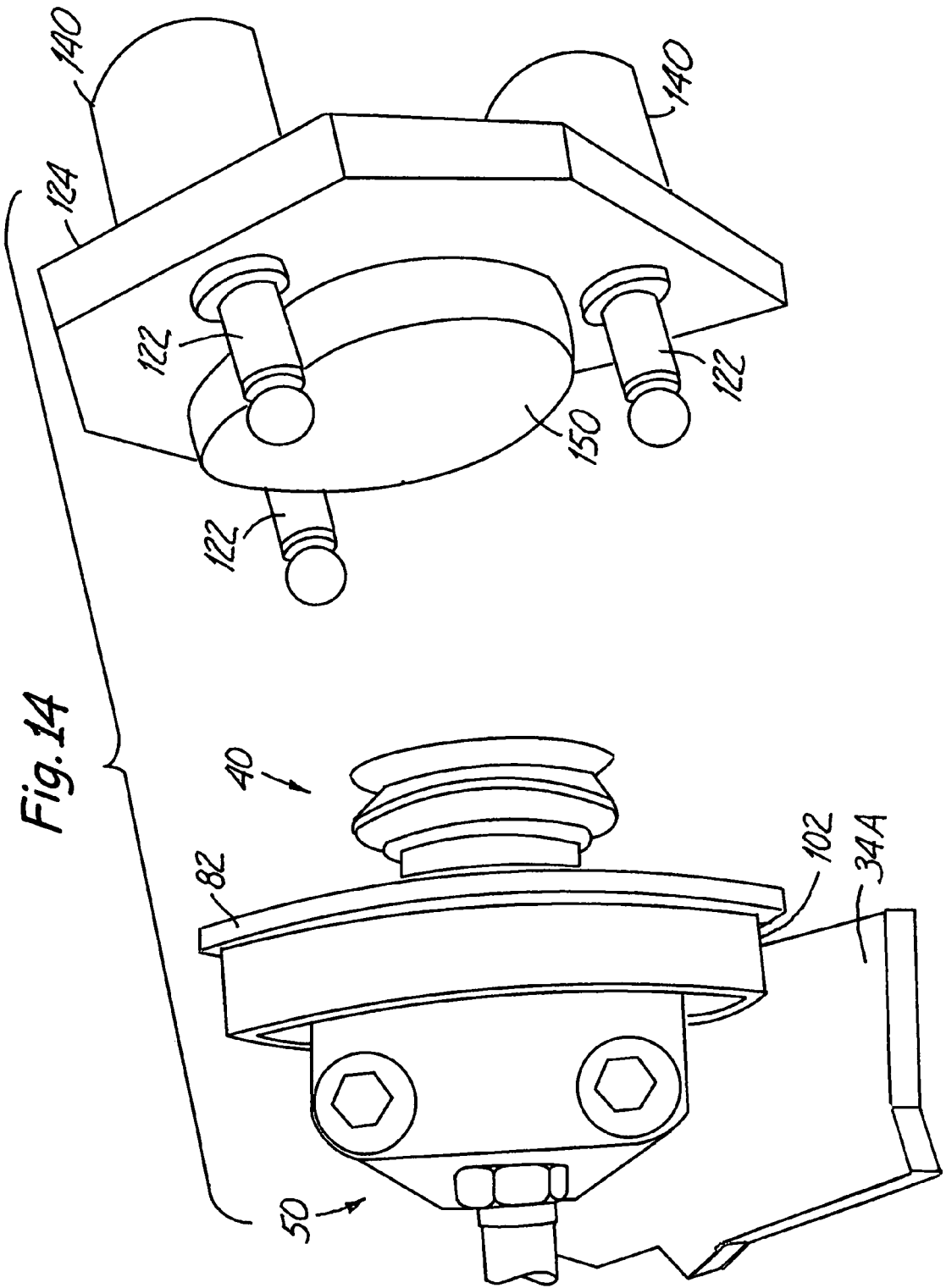

With the positional information known for each remote end 40 of each support assembly 19, and the aligning fixture 80 coupled to the end effector 21, the controller 160 operates the system to position the aligning fixture 80 proximate a selected support assembly 19 such that the registration surface 150 is at least proximate a position coinciding with the surface of the workpiece to be placed on the holding assembly 17 (e.g. the final aligned position) . FIGS. 13-18 schematically illustrate alignment of a remote end 40 once this position has been obtained. FIG. 13 illustrates a home position, wherein a portion of the aligning fixture 80 is shown. FIG. 14 is an enlarged view of FIG. 13.

Figure 15:
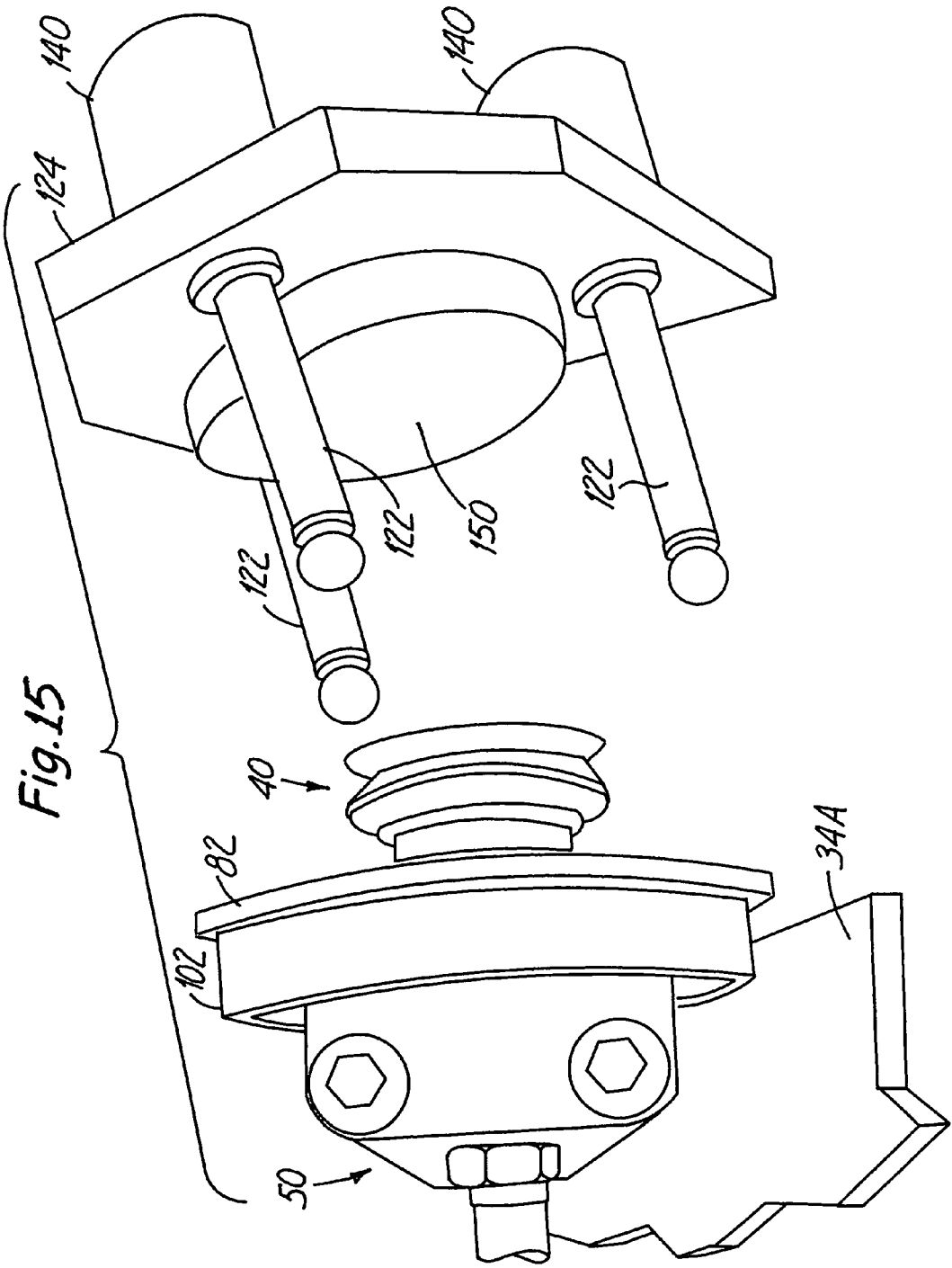

FIG. 15 illustrates extension of the elongated rods 122 through operation of actuator 130. The remote ends of the elongated rods 122 define a plane coinciding with the remote, aligned position desired of the remote end 40 of the support assembly 19.

Figure 16:
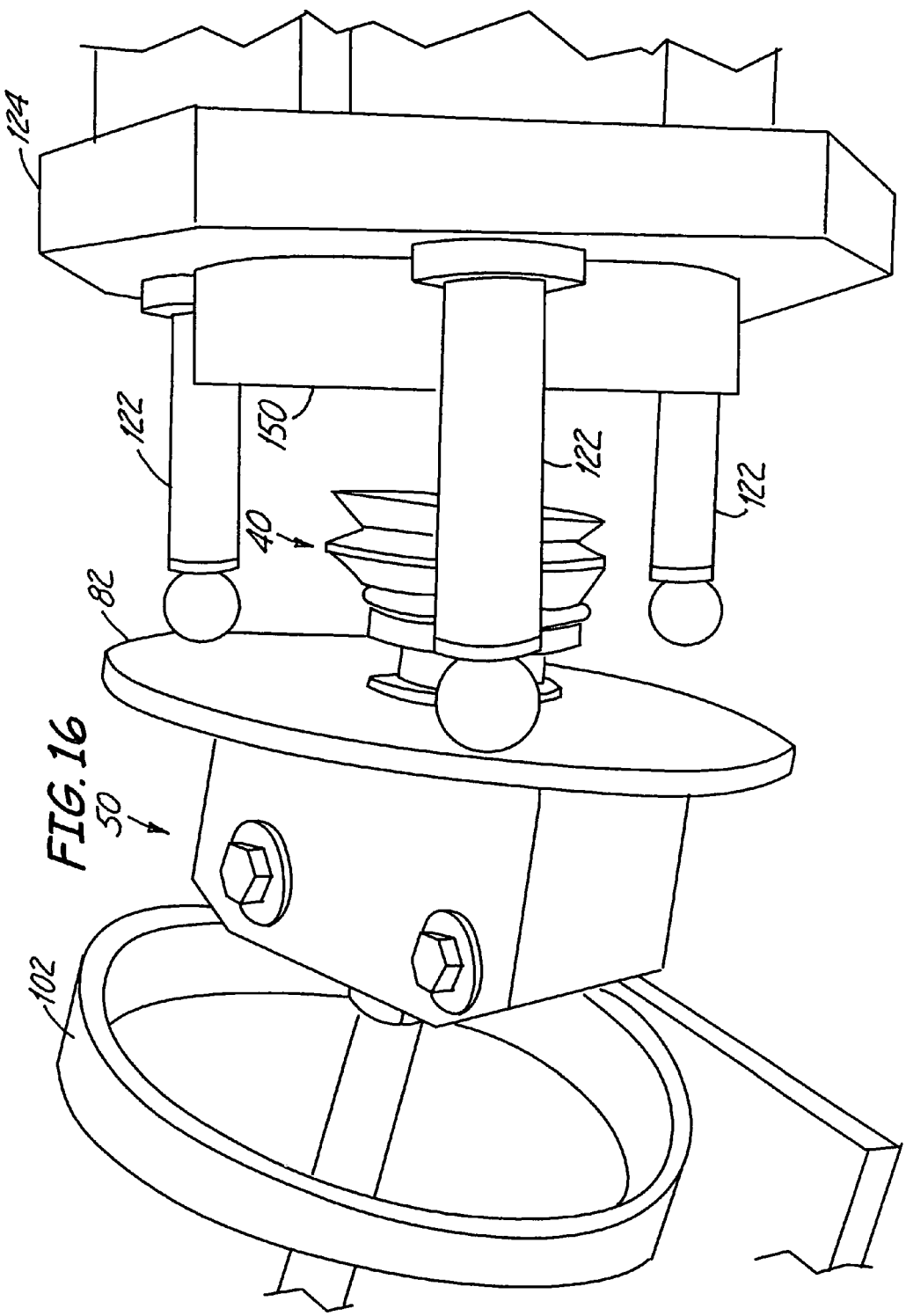
Figure 17:
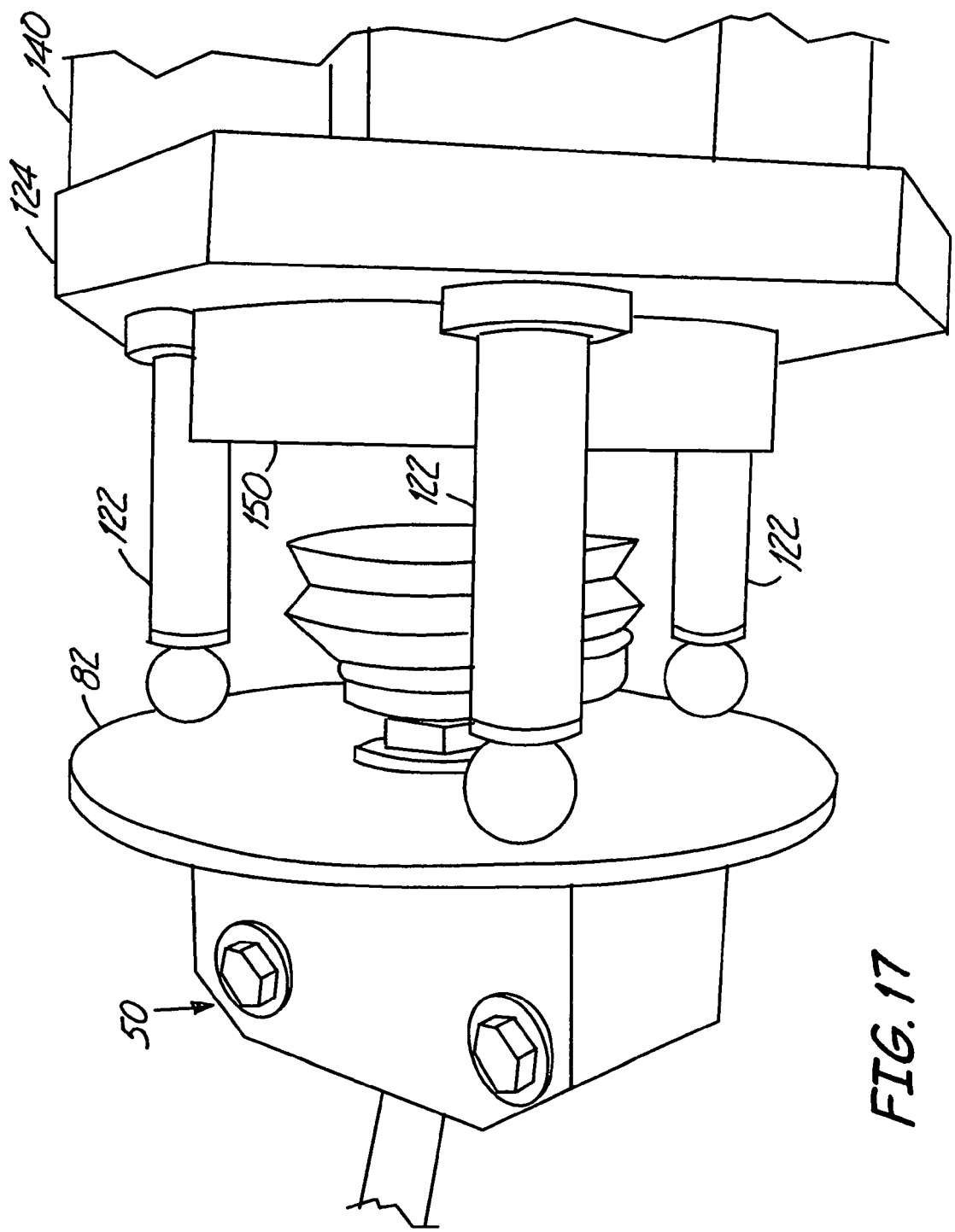
Figure 18:
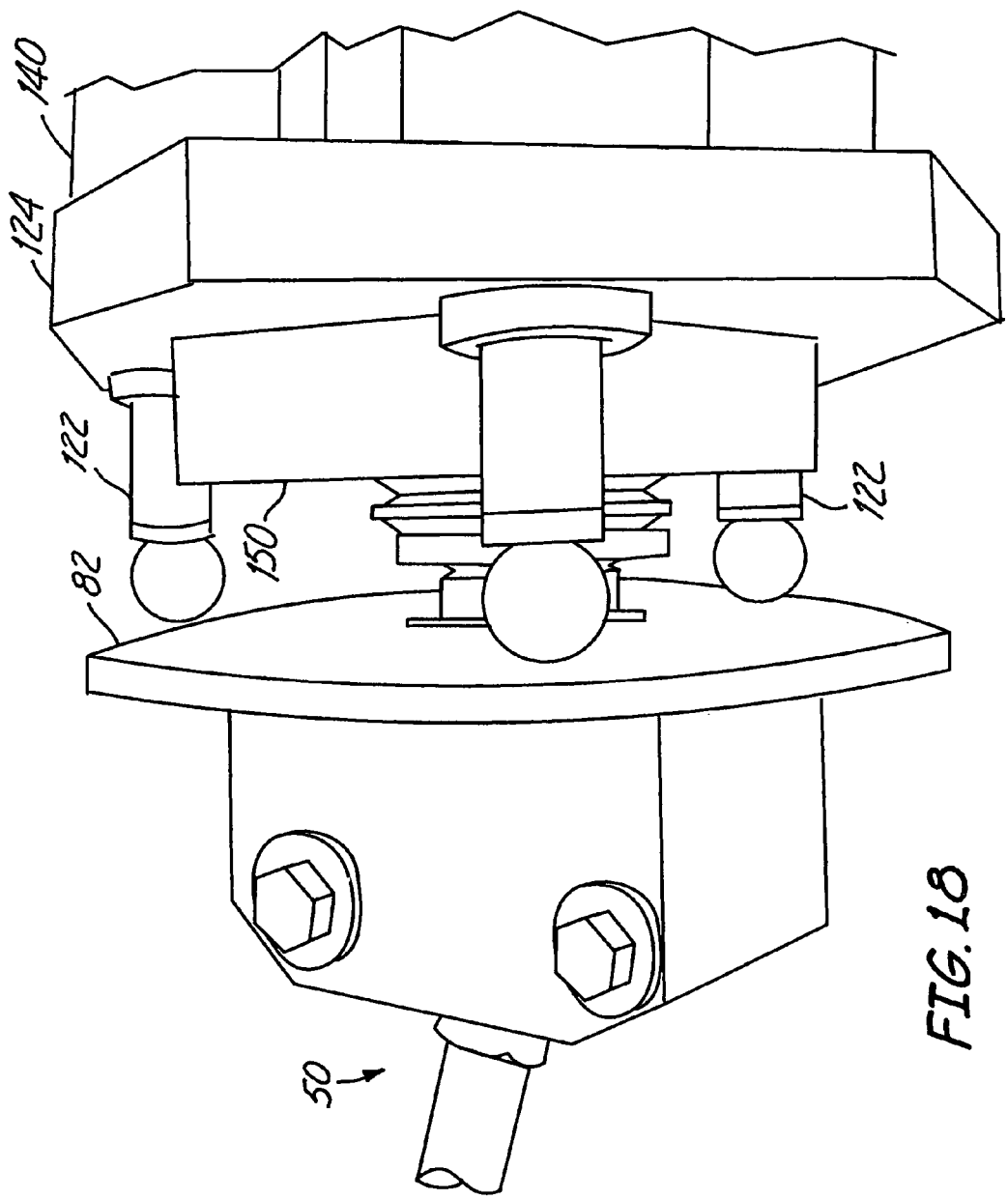

In FIG. 16, the support assembly 19 is operated so as to extend the remote end 40 until the alignable member 82 of the remote end 40 engages eventually each of the elongated rods 122. With contact of each rod 122 with the alignable member 82, the rod 122 moves slightly such. that the end 145 of the rod engages the corresponding limit switch 143. FIG. 16 illustrates contact of the alignable member 82 with two rods 122, while FIG. 17 illustrates contact with all three rods 122. Extension of the actuator rod of the support assembly 19 will cause rotation of the friction settable coupling 50 and the remote end 40 as a whole until the alignable member 82 contacts each of the ends of the elongated rods 122. Contact of the rods 122 with the alignable member 82 orients the remote end 40 by developing an advantageous moment arm to move the friction settable coupling 50. Note also that the rods 122 keep the cup 88 preferably away from the surface 150 so as not to cause wear upon the cup during orientation. As indicated above, suitable sensors coupled to the elongated rods 122 or other proximity sensors can detect contact of the alignable member 82 with each corresponding rod end.

Having obtained the remote, aligned position, the support assembly 19 can then be operated so as to further displace the remote end 40 toward the registration surface 150 whereupon, the surface 90 of the mount 86 of the vacuum cup assembly 84 will engage the limit switch 148 on the surface 150 of the aligning fixture 80.

In one embodiment, the registration surface 150 is held at the final desired position. However, it should be noted, in another embodiment, the positioning device can move the aligning fixture 80 with the remote end 40 coupled to the registration surface 150 to the final aligned position (herein along the axis of the actuator 60) if the actuator 60 is allowed to "float".

It should be noted that the elongated rods 122 are retracted prior to or during final displacement of the remote end 40. If equipped with a vacuum cup 84, a vacuum can be drawn with engagement of the deformable cup 88 upon the surface 150. A pressure sensor 173 can be provided in the aligning fixture 80 with a port 170 (FIG. 11) coupled to a fluid passageway 171 opening to the surface 150 so as to sense the vacuum and ensure proper operation. If desired, the vacuum can pull the remote end 40 until the mount engages the surface 150. If a desired vacuum has been obtained, indicating proper operation, atmospheric air can be allowed to enter the vacuum formed by the deformable cup 88, thereby releasing the vacuum. The support assembly 19 can include a Valve to allow air at atmospheric pressure or pressurized air to enter the deformable cup 88. At this time, or earlier, the brake assembly 62 of the support assembly 19 can be operated to lock the position of the actuator rod.

Each remote end 40 of each support assembly 19 is positioned in this manner. When it is desired that the support assemblies 19 be reconfigured for a different workpiece, the brake assembly 62 of each support assembly 19 is operated to release the actuator rod thereby allowing retraction of the remote ends 40 to their respective home positions by contact of the alignable member 82 of each remote end 40 with its corresponding stop 102 as described above.

Figure 19:
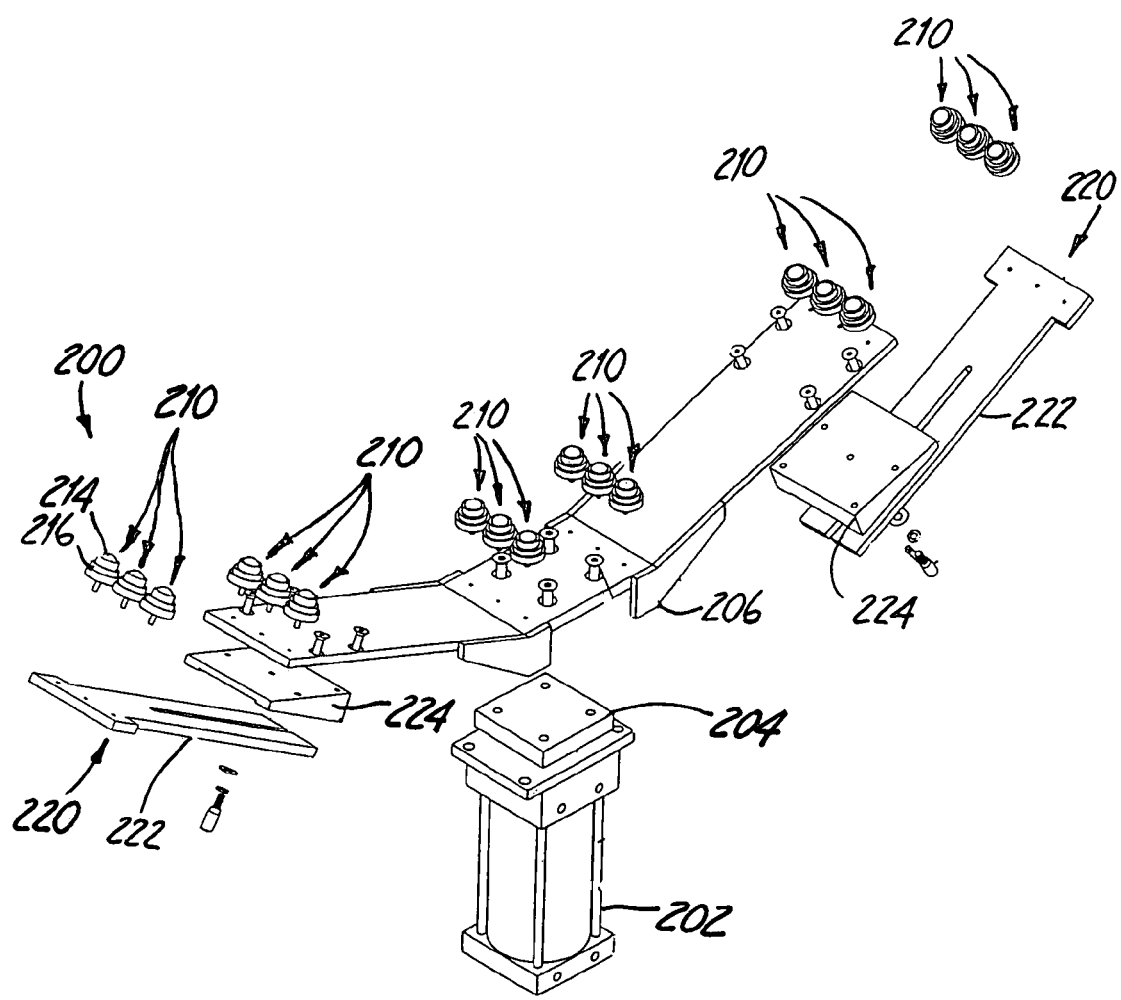
FIG. 19 is a perspective exploded view of a temporary support assembly.
Figure 20:
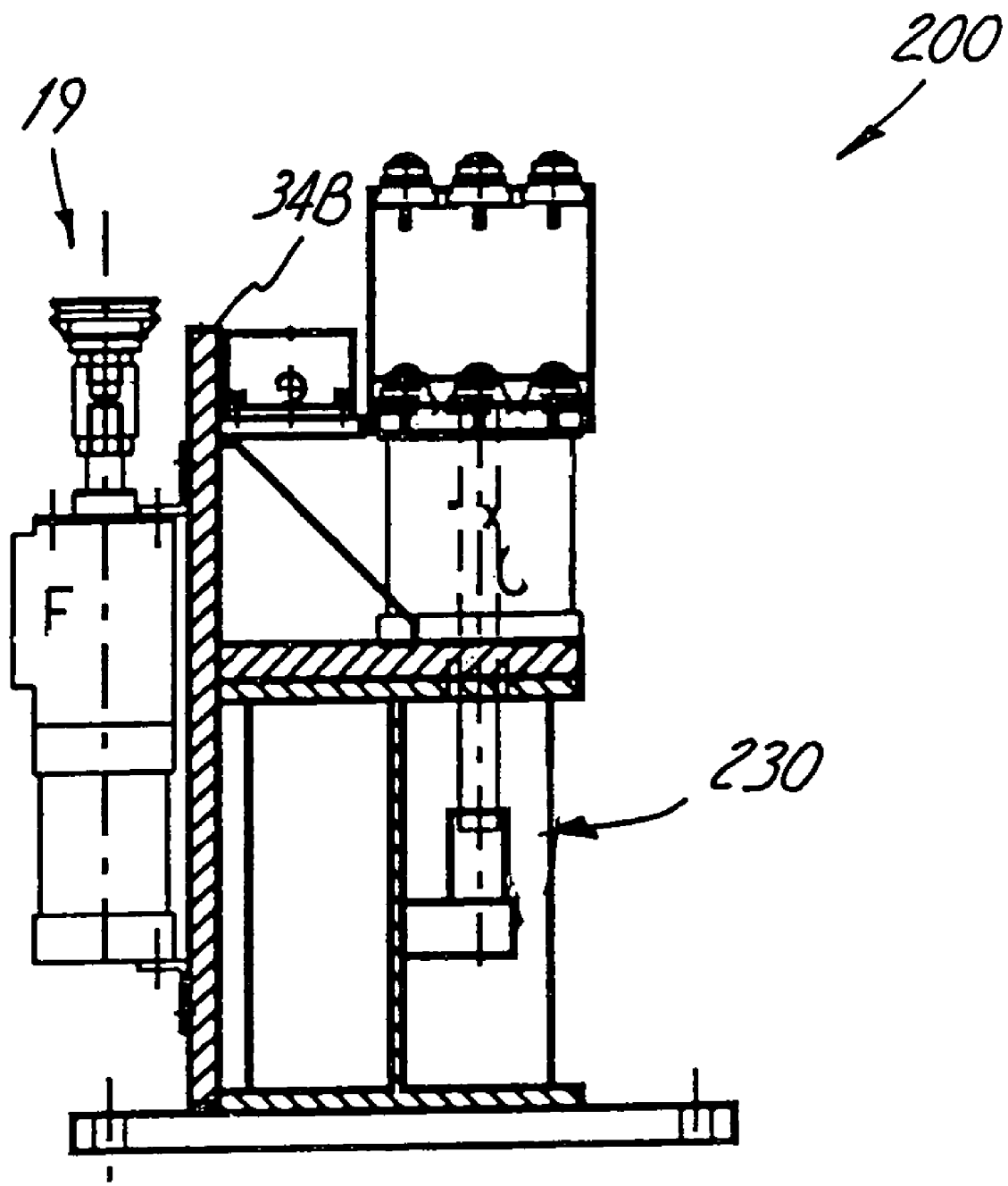
FIG. 20 is a side view of a temporary support assembly.

In a further embodiment, the holding assembly 17 can include temporary supports 200 used to support the workpiece above the support assemblies 19 until a proper position has been obtained at which point the temporary support 200 can be used to lower the workpiece upon the support assemblies 19. Referring to FIG. 19, the temporary support 200 includes an actuator 202 (pneumatic, hydraulic, electric or mechanical) having an end 204 connected to a support plate 206. In the embodiment illustrated, the support plate 206 is generally "U" or "V" shaped in view of the generally cylindrically or conical shaped workpieces exemplified herein; however, the support plate 206 can take any desired form necessary to support a corresponding workpiece. Ball assemblies 210 are mounted to plate 206 and provide a plurality of contact points for supporting the workpiece. Each ball assembly 210 includes a ball 214 captured in a socket 216 to allow free rotation of the ball 214 in the socket 216, which is secured to the plate 206. In this manner, the workpiece can be easily adjusted in order to obtain a proper position prior to lowering the workpiece on the support assemblies 19. Additional ball assemblies 210 can be provided on adjustable extensions 220. Each extension 220 comprises a plate 222 adjustably mounted to a spacer block 224 that in turn is mounted to the support plate 206. Various spacer blocks 224 can be used to obtain the desired orientation of the ball assemblies 210 mounted to the plates 222. Referring to FIGS. 4 and 20, the temporary support 200 can be mounted to the support plate 34B of one, some or all of the banks 24. An anti-rotation device 230 can be operably coupled to the plate 206 to inhibit rotation.

Although the present invention has been described with reference to preferred embodiments, workers skilled in the art will recognize that changes may be made in form and detail without departing from the spirit and scope of the invention.

What is claimed is:

1. A holding assembly comprising:
a plurality of support assemblies, each support assembly comprising an end adapted to support a workpiece, wherein each end includes a movable coupling adapted to hold the end in a selected orientation; and
a positioning device having a remote end moveable to a position proximate the end of the support assembly, the remote end configured to operate the moveable coupling so as to obtain the selected orientation of each end, wherein the remote end is an aligning fixture comprising:
a support having a mount coupleable to the positioning device and a reference surface;
an aligning member; and
an aligning actuator mounted to the support and operably coupled to the aligning member to move the aligning member selectively to a first position in front of the reference surface wherein an element to be aligned is spaced apart from the reference surface and to a second position where the element can engage the reference surface.

2. The holding assembly of claim 1 wherein the aligning member comprises a retractable rod.

3. The holding assembly of claim 2 wherein the aligning member comprises a set of spaced apart retractable rods.

4. The holding assembly of claim 3 and further comprising the aligning actuator is operably coupled to the spaced apart retractable rods.

5. The holding assembly of claim 4 and further comprising a connector coupling the aligning actuator to the spaced apart retractable rods.

6. The holding assembly of claim 5 and a sensor operably coupled to each of the rods to detect contact of a remote end of the rod with the element.

7. The holding assembly of claim 6 wherein each sensor detects movement of the corresponding rod when the remote end of the rod contacts the element.

8. The holding assembly of claim 1 wherein the reference surface includes a port coupled to a fluid passageway.

9. The holding assembly of claim 8 and further comprising a pressure sensor operably coupled to the port with the fluid passageway.

10. The holding assembly of claim 1 and further comprising a sensor to sense contact of the element with the aligning member.

11. The holding assembly of claim 1 and further comprising a second sensor to sense contact of the element with the reference surface.

12. A holding assembly comprising:
a plurality of support assemblies, each support assembly comprising an end adapted to sup ort a workpiece, wherein each end includes a movable coupling adapted to hold the end in a selected orientation; and
a positioning device having a remote end moveable to a position proximate each end of each support assembly, the remote end configured to operate each moveable coupling so as to obtain the selected orientation of each end, and wherein the remote end comprises a mount; and
an end effector detachably coupleable to the mount and comprising a tool to perform inspection or work on a workpiece.

13. The holding assembly of claim 12 wherein the positioning device comprises a controller configured to orient each of the ends of the plurality of support assemblies and to perform inspection or work on a workpiece with the end effector.

14. The holding assembly of claim 12 wherein the ends can be selectively positioned to define points along a curve.

15. The holding assembly of claim 12 wherein the support assemblies are mounted on a support structure having a base and a support moveable on the base, wherein at least one support assembly is mounted to the support.

16. The holding assembly of claim 15 and further comprising a second support moveable on the base, wherein at least one support assembly is mounted to the support.

17. A holding assembly comprising:
a plurality of support assemblies, each support assembly comprising a linear actuator with an end adapted to support a workpiece, wherein each end includes a movable coupling adapted to hold the end in a selected orientation;
a positioning device having a remote end moveable to a position proximate each end of each support assembly, the remote end configured to operate each moveable coupling so as to obtain the selected orientation of each end; and
a support wherein the plurality of support assemblies are mounted to the support such that at least some of the axes of the linear actuators are non-parallel.

18. A holding assembly comprising:
a plurality of support assemblies, each support assembly comprising an end adapted to support a workpiece, wherein the end includes a movable coupling adapted to hold the end in a selected orientation, wherein the movable coupling comprises elements maintaining the selected orientation by friction; and
a positioning device having a remote end moveable to a position proximate each end of each support assembly, the remote end configured to operate each moveable coupling so as to obtain the selected orientation of each end.

19. The holding assembly of claim 18 wherein the ends can be selectively positioned to define points along a curve.

20. A holding assembly comprising:
a plurality of support assemblies, each support assembly comprising an end adapted to support a workpiece, wherein each end includes a movable coupling adapted to hold the end in a selected orientation; and
a positioning device having a remote end moveable to a position proximate each end of each support assembly, the remote end configured to operate each moveable coupling so as to obtain the selected orientation of each end, the positioning device including: a controller configured to position the remote end so as to adjust each of the movable couplings; and wherein the holding assembly further comprises an end effector detachably coupleable to the remote end and comprising a tool to perform inspection or work on a workpiece.

21. The holding assembly of claim 20 wherein the controller is configured to orient each of the ends and to perform inspection or work on a workpiece with the end effector.

* * * * *